United States Patent
Kinoshita et al.

(10) Patent No.: US 7,421,755 B2
(45) Date of Patent: Sep. 9, 2008

(54) COUPLING DEVICE AND WIPER BLADE

(75) Inventors: Nobuaki Kinoshita, Novi, MI (US); Yasuhiro Iijima, Kosai (JP)

(73) Assignees: ASMO Co., Ltd., Shizuoka-Ken (JP); Nippon Wiper Blade Co., Ltd., Saitama-Ken (JP)

( * ) Notice: Subject to any disclaimer, the term of this patent is extended or adjusted under 35 U.S.C. 154(b) by 888 days.

(21) Appl. No.: 10/886,511

(22) Filed: Jul. 7, 2004

(65) Prior Publication Data

US 2005/0005387 A1  Jan. 13, 2005

(30) Foreign Application Priority Data

Jul. 8, 2003 (JP) ............... 2003-271934

(51) Int. Cl.
*B60S 1/40* (2006.01)
(52) U.S. Cl. ............. 15/250.32; 15/250.43; 15/250.351
(58) Field of Classification Search ............. 15/250.32, 15/250.351, 250.201, 250.361, 250.43, 250.44
See application file for complete search history.

(56) References Cited

U.S. PATENT DOCUMENTS 4,670,934 A * 6/1987 Epple et al. ............... 15/250.32
5,145,274 A * 9/1992 Schon ........................ 403/79
5,680,669 A * 10/1997 Egner-Walter ......... 15/250.352

FOREIGN PATENT DOCUMENTS

| EP | 0694458 | 1/1996 | |
| EP | 0694459 | 1/1996 | |
| FR | 2 738 201 | 3/1997 | |
| FR | 2740089 | 4/1997 | |
| GB | 872862 | 4/1959 | |
| GB | 2 348 118 A | 9/2000 | |
| JP | 58-128159 | 8/1983 | |
| JP | 61-183245 | 11/1986 | ............. 1/34 |
| JP | 06-35064 | 5/1994 | |
| JP | 6-75931 | 10/1994 | ............. 1/40 |
| JP | 2001-163188 | 9/2000 | |

* cited by examiner

*Primary Examiner*—Gary K Graham
(74) *Attorney, Agent, or Firm*—Morris Manning & Martin LLP; Tim Tingkang Xia (57) ABSTRACT

A coupling device has a clip and a clip holder. A hook at a distal portion of a wiper arm is attached to the clip. The clip holder has a locking member and a cover. The cover extends along the longitudinal direction of the wiper arm. The cover has a first cover portion and a second cover portion. When the clip holder is located at an engage position where the clip holder is engaged with the clip, the second cover portion extends to connected parts of a boundary between a retainer and an arm piece.

17 Claims, 7 Drawing Sheets

Fig.9

COUPLING DEVICE AND WIPER BLADE

BACKGROUND OF THE INVENTION

The present invention, relates to a wiper blade for wiping the windshield of a vehicle.

For example, Japanese, Laid-Open-Utility Model Publication No. 61-183245 discloses a coupling structure for coupling a wiper blade to a wiper arm. A U-shaped hook is formed at the distal portion of the wiper arm. The hook is engaged with a coupling device attached to the wiper blade. The coupling device includes a supporting member, which is pivotally supported by a yoke, and a retaining member. The hook, which is supported by the supporting member, is engaged with the retaining member, so that the wiper blade is prevented from coming off the distal portion of the wiper arm.

As a result of recent maturity of consumer preferences and the market, a high emphasis is placed on the design of vehicles. Accordingly, the design of wiper arms and wiper blades are sought to be improved. However, in the case of the coupling device disclosed in the above publication, the boundary between the distal portion of the wiper arm and the retaining member is exposed to the outside. The wiper blade assembly therefore lacks integrated appearance, which degrades the appearance of the wiper blade and the wiper arm. In cold climates, snow can collect on the boundary between the distal portion of the wiper arm and the retaining member. Also, water droplets that penetrate through the boundary can be frozen. As a result, the operation of the wiper blade is hindered, and the load on the wiper blade is increased.

SUMMARY OF THE INVENTION

Accordingly, it is an objective of the present invention to provide a coupling device and a wiper blade that prevent foreign matter from entering the coupling portion with a wiper arm and have a highly improved design.

To achieve the foregoing and other objectives and in accordance with the purpose of the present invention, a coupling device for pivotally coupling a wiper blade to a wiper arm is provided. The coupling device is attached to a coupling shaft to be pivotable about an axis of the coupling shaft. The device includes a base member and a locking member. A distal portion of the wiper arm is attached to the base member. The locking member has a locking portion and a cover. The locking member is movable relative to the base member between an engage position and a disengage position. When the locking member is located at the engage position, the locking portion is engaged with the distal portion of the wiper arm, and the engaged parts of the distal portion of the wiper arm and the locking portion are covered with the cover.

The present invention also provides a wiper blade assembly pivotally attached to a distal portion of a wiper arm. The assembly includes a wiper blade and a coupling device. The wiper blade has a coupling portion. The coupling portion has a coupling shaft and an insertion opening to which the distal portion of the wiper arm is inserted. The coupling device is pivotally supported by the coupling shaft, and includes a base member and a locking member. The distal portion of the wiper arm is attached to the base member. The locking member has a locking portion and a cover. The locking member is movable relative to the base member between an engage position and a disengage position. When the locking member is located at the engage position, the locking portion is engaged with the distal portion of the wiper arm, and the engaged parts of the distal portion of the wiper arm and the locking portion are covered with the cover.

Further, the present invention provides a wiper of a vehicle for wiping a surface to be wiped of the vehicle. The wiper includes a wiper arm, a wiper blade, and a coupling device. The wiper arm has a distal portion and a proximal portion. The proximal portion is fixed to a pivot that is pivotally supported by a vehicle body. The wiper arm is urged to the surface to be wiped. The wiper blade has a coupling portion. The coupling portion has a coupling shaft and an insertion opening to which the distal portion of the wiper arm is inserted. The coupling device is pivotally supported by the coupling shaft, and includes a base member and a locking member. The distal portion of the wiper arm is attached to the base member. The locking member has a locking portion and a cover. The locking member is movable relative to the base member between an engage position and a disengage position. When the locking member is located at the engage position, the locking portion is engaged with the distal portion of the wiper arm, and the engaged parts of the distal portion of the wiper arm and the locking portion are covered with the cover.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3($a$) is a side view illustrating the coupling portion of the wiper blade shown in FIG. 1;

FIG. 3($b$) is a side view illustrating the coupling portion of the wiper blade shown in FIG. 1;

FIG. 4($a$) is a plan view illustrating a clip;

FIG. 4($b$) is a side view illustrating the clip;

FIG. 4($c$) is a cross-sectional view taken along line 4$c$-4$c$ of FIG. 4($a$);

FIG. 5($a$) is a plan view illustrating a clip holder;

FIG. 5($b$) is a side view illustrating the clip holder;

FIG. 5($c$) is a cross-sectional view taken along line 5$c$-5$c$ of FIG. 5($a$);

FIG. 5($d$) is a cross-sectional view taken along line 5$d$-5$d$ of FIG. 5($a$);

FIG. 7($a$) is a cross-sectional view illustrating the coupling portion of the wiper blade;

FIG. 7($b$) is a cross-sectional view illustrating the coupling portion of the wiper blade;

DETAILED DESCRIPTION OF THE PREFERRED EMBODIMENTS

A preferred embodiment of the present invention will now be described with reference to FIGS. 1 to 7($b$).

Figure 1:
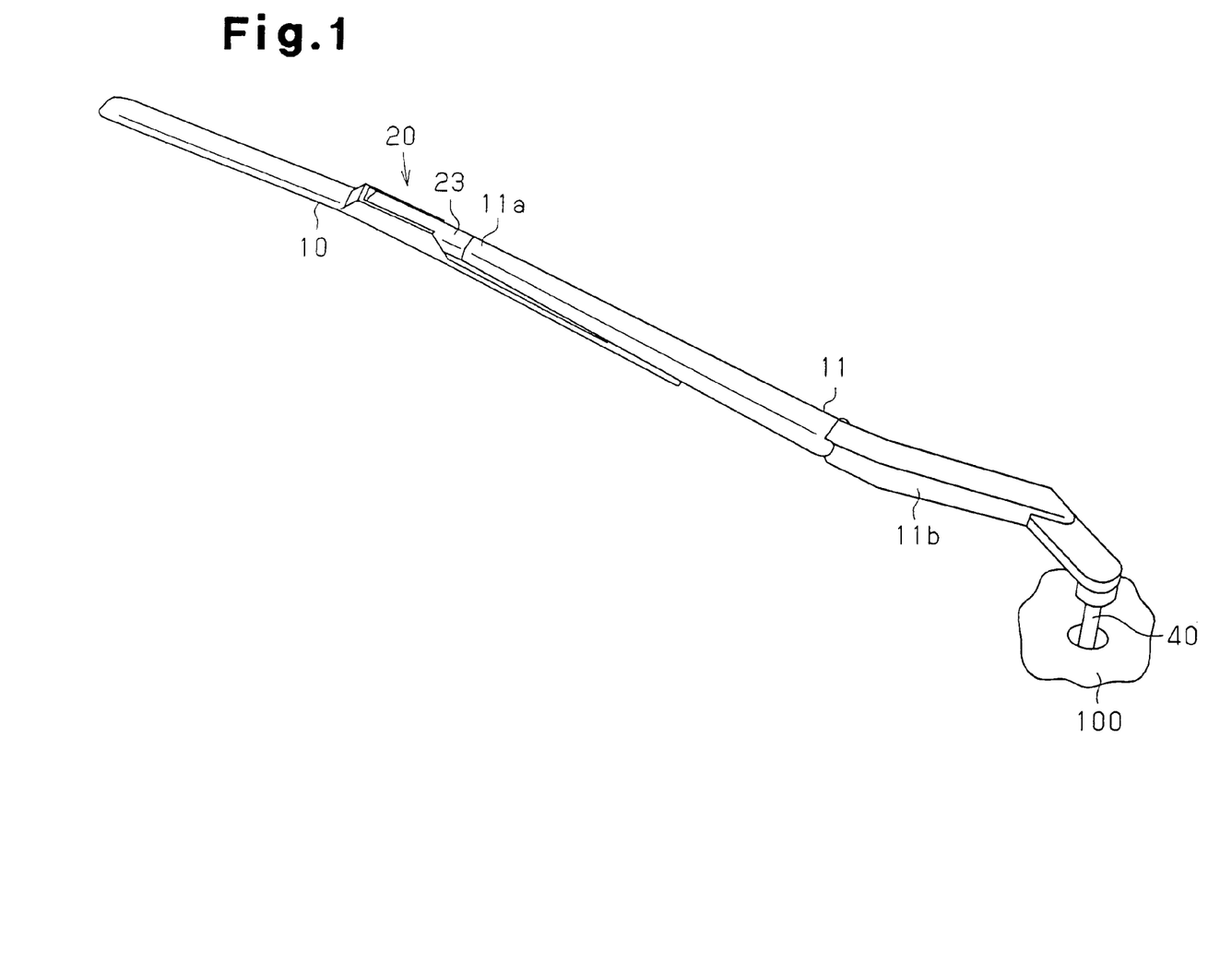
FIG. 1 is a perspective view illustrating a state where a wiper blade according to one embodiment attached to a wiper arm.

As shown in FIG. 1, a wiper blade 10 is attached to a distal portion 11a of a wiper arm 11. The wiper blade 10 is urged toward a surface to be wiped by the wiper arm 11. A head of the wiper arm 11, or an arm head 11b, is located at a proximal portion of the wiper arm 11. The arm head 11b is coupled to a drive source (not shown) of a vehicle 100 by a link mechanism having a pivot 40. When the wiper arm 11 pivoted in a reciprocating manner in a predetermined range, the wiper blade 10 is pivoted in reciprocating manner. When reciprocated, the wiper blade 10 wipes the surface to be wiped.

Figure 2:
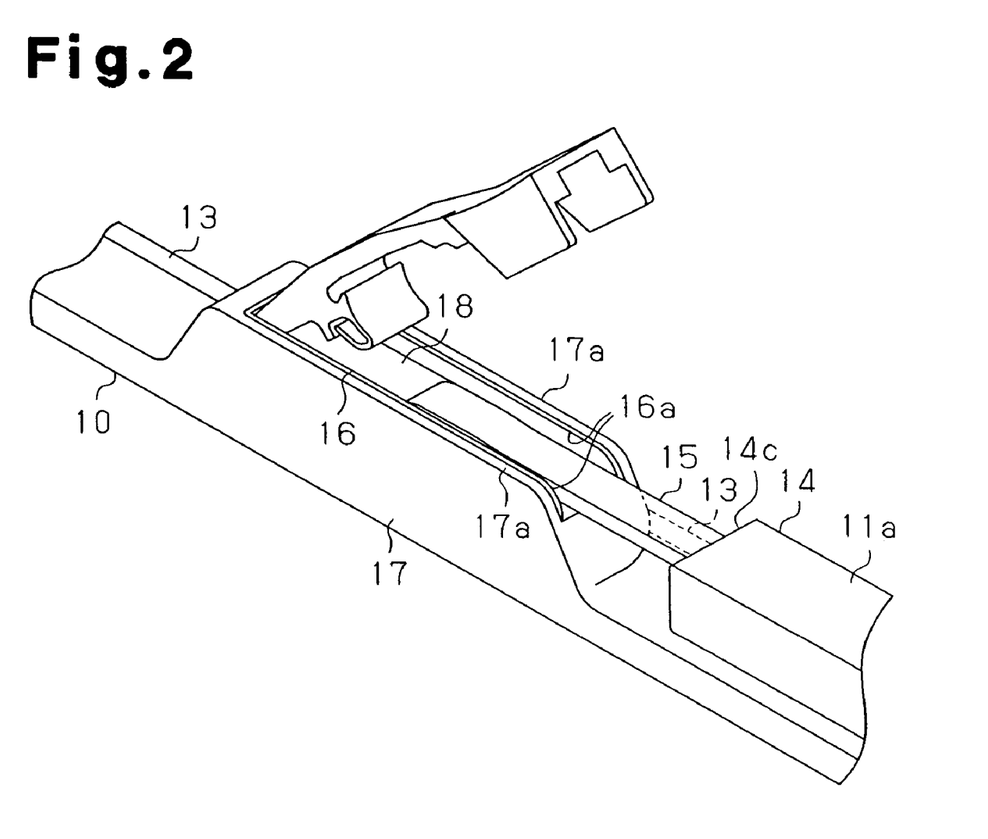
FIG. 2 is a perspective view illustrating a coupling portion of the wiper blade shown in FIG. 1.

As shown in FIG. 2, the wiper arm 11 has a retainer 14 having a channel-like cross-section. A proximal portion of the retainer 14 is coupled to a distal portion of the arm head 11b. An arm piece 15 formed as a flat plate extends from an end face 14c of the distal portion of the retainer 14. The end face 14c of the retainer 14 corresponds to the boundary between the retainer 14 and the arm piece 15. A spring (not shown) for urging the wiper arm 11 is provided between the arm head 11b and the retainer 14 or between the arm head 11b and the arm piece 15.

The wiper blade 10 has a substantially box-shaped coupling portion 17 at a center in the longitudinal direction. A holder 16 is fitted in the coupling portion 17. The holder 16 has a pair of side walls 16a. The holder 16 is made, for example, of metal and attached to a lever or backing that support a blade rubber (not shown). The outer surfaces of the side walls 16a of the holder 16 are covered with side walls 17a forming the coupling portion 17. A fin portion 13 is integrally formed with each longitudinal end of the coupling portion 17. The fin portions 13 press the blade rubber (not shown). Part of the coupling portion 17 (including the holder 16) that opens upward functions as an insertion opening 18 into which the distal portion of the arm piece 15 is inserted.

Figure 3A:
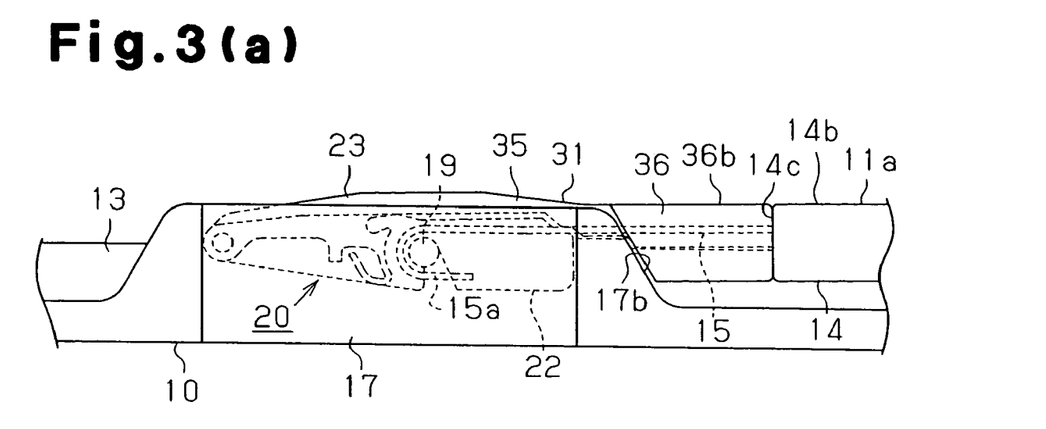
Figure 3B:
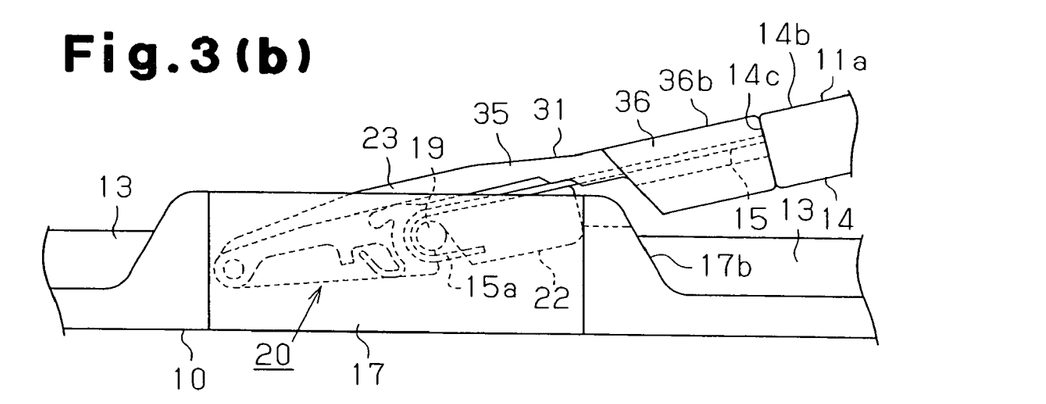

As shown in FIGS. 3(a) and 3(b), a hook 15a having a U-shaped cross-section is formed at the distal portion of the arm piece 15. A coupling device 20 is detachably attached to the hook 15a. A coupling shaft 19 of the holder 16 is provided in the coupling portion 17. The coupling shaft 19 couples the side walls 16a to each other. The coupling device 20 is pivotally coupled to the coupling shaft 19. The wiper blade 10 is detachably and pivotally attached to the distal portion of the wiper arm 11 with the coupling device 20. The wiper blade 10 and the coupling device 20 form a wiper blade assembly.

The coupling device 20 includes a base member, which is a clip 22, and a locking member, which is a clip holder 23. The structure of the clip 22 will now be described with reference to FIGS. 4(a) to 4(c).

Figure 4A:
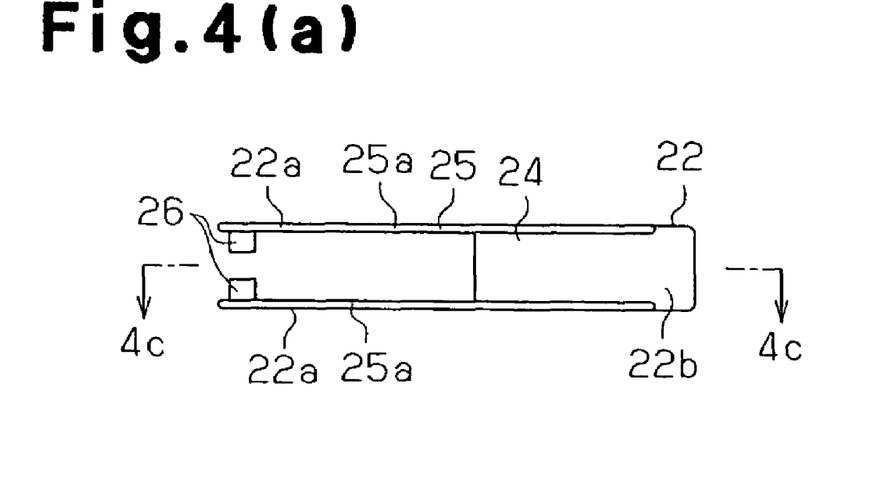
Figure 4B:
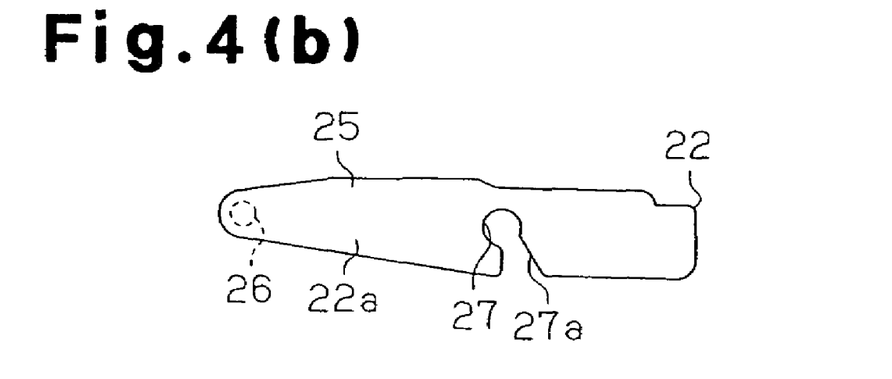
Figure 4C:
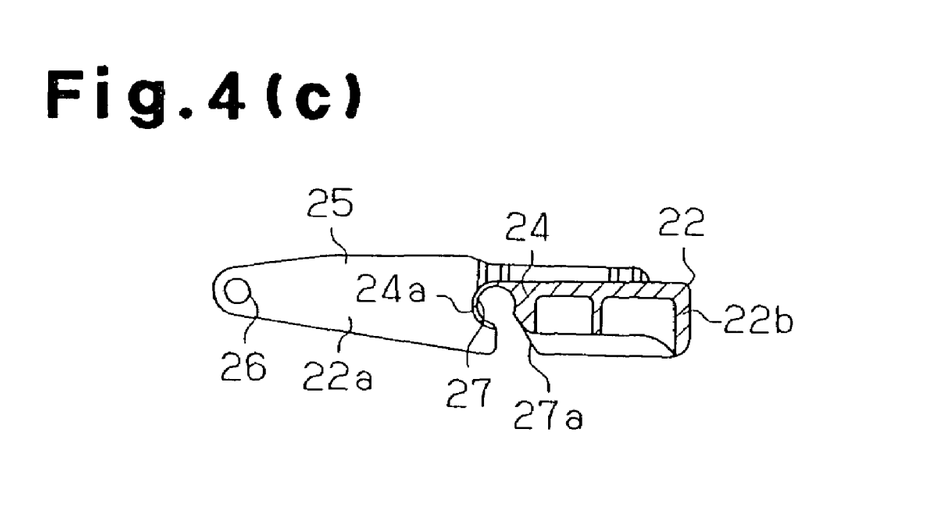

As shown in FIGS. 4(a) to 4(c), the clip 22 has a pair of side walls 22a and a base portion 22b connecting the side walls 22a with each other. The clip 22 has an attaching portion 24 and a support hole 27 in the base portion 22b. An attaching surface 24a of the attaching portion 24 substantially has the same dimensions and the same shape as the inner surface of the hook 15a. A guide groove 27a communicating with the support hole 27 is formed in the attaching portion 24. The distance between the edges of the guide groove 27a is widened downward. When the hook 15a is attached to the attaching portion 24, a folded portion of the hook 15a blocks the opening of the guide groove 27a. The coupling shaft 19 is thus prevented from coming off the support hole 27.

The clip 22 has extended portions 25 each of which is part of one of the side walls 22a and extends in the longitudinal direction. Support pins 26 project from the inner surfaces of the extended portions 25 of the side walls 22a, and face each other. The position of the support pins 26 are determined such that, when a force in a direction removing the arm piece 15 from the attaching portion 24 is applied to the arm piece 15 attached to the attaching portion 24, a component of the force acts about the support pins 26 in a direction disengaging the clip holder 23.

The structure of the clip holder 23 will now be described with reference to FIGS. 3(a), 3(b), FIGS. 5(a) to 5(d), and FIG. 6. FIG. 6 is plan view showing the relative positions of the clip holder 23, the wiper blade 10, the clip holder 23, and the wiper arm 11 when the wiper blade 10 is attached to the distal portion 11a if the wiper arm 11 (the hook 15a of the arm piece 15).

Figure 5A:
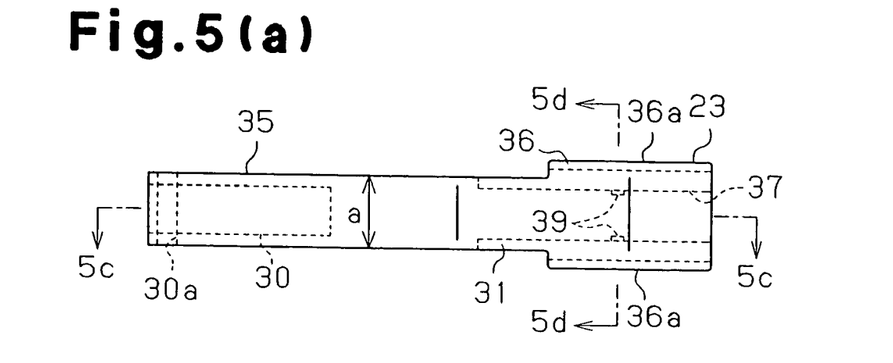
Figure 5B:
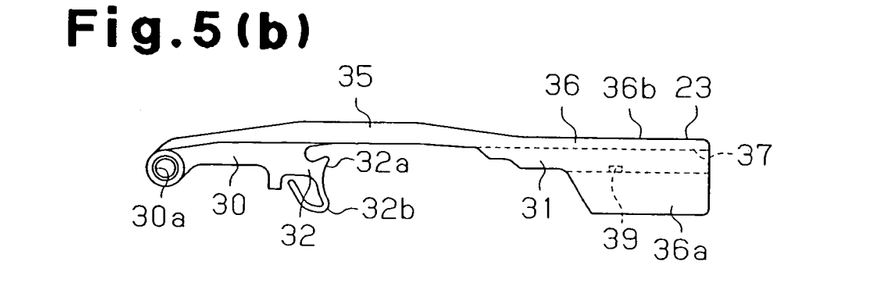
Figure 5C:
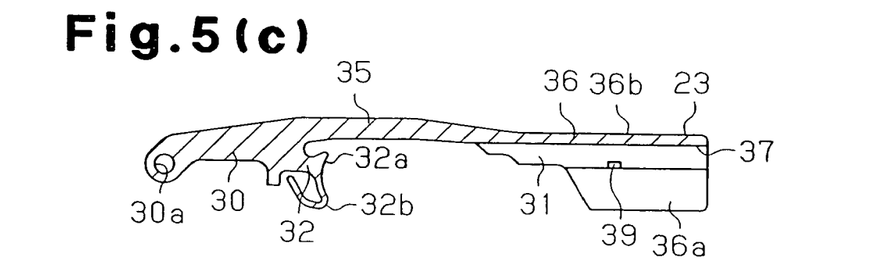
Figure 5D:
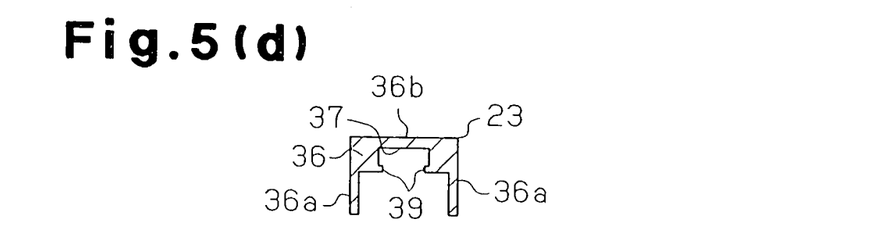
Figure 6:
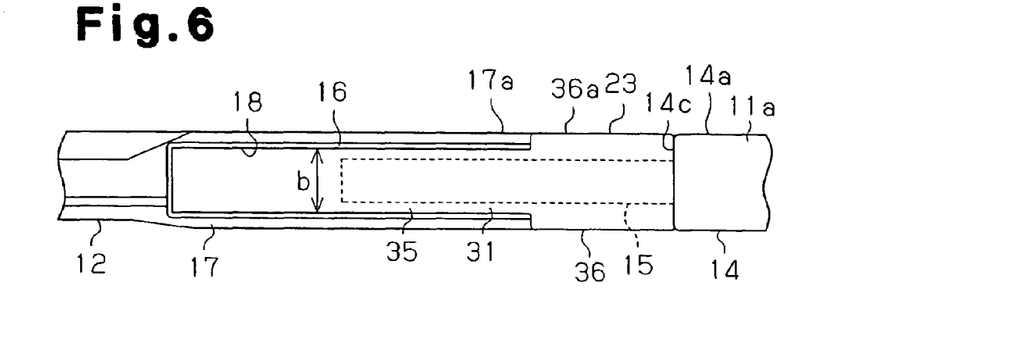
FIG. 6 is a plan view illustrating the coupling portion of the wiper blade.

As shown in FIGS. 5(a) to 5(c), the clip holder 23 has a locking portion 30 and a cover 31. The locking portion 30 and the cover 31 are integrally formed with a resin material. A support hole 30a is formed in an end of the locking portion 30. An engaging portion 32 having an engaging surface 32a is formed in the locking portion 30. The engaging portion 32 has a curved portion 32b that is curved from the distal end to the distal end. By flexing the curved portion 32b, the engaging surface 32a of the engaging portion 32 is engaged with the outer surface of the hook 15a.

The cover 31 extends (along the longitudinal direction of the arm piece 15 :(see FIGS. 3(a) and 3(b)). The cover 31 has a first cover portion 35 and a second cover portion 36. The first cover portion 35 extends from the locking portion 30 and is substantially shaped like a flat plate. The second cover portion 36 extends from the proximal end of the first cover 35 and has a U-shaped cross section. As shown in FIGS. 5(a) and 6, the width a of the first cover portion 35 is substantially the same as the width b of the insertion opening 18 formed in the coupling portion 17.

As shown in FIGS. 5(a) to 5(d), the second cover portion 36 has a pair of side walls 36a and an upper wall 36b. An accommodating recess 37 having a rectangular cross-section is formed in the second cover portion 36. The accommodating recess 37 extends along the longitudinal direction of the cover. 31. Engaging bodies, which are pair of engaging projections 39, are formed in the second cover portion 36. The engaging projections 39 are arranged to face each other.

As shown in FIGS. 3(a), 3(b), and 6, the clip holder 23 are arranged along the longitudinal direction of the arm piece 15. The cover 31 is arranged to cover the arm piece 15 that is attached to the coupling portion 17. That is, the arm piece 15 attached to the coupling portion 17 is covered with the first cover portion 35 from the distal end to a middle portion, and with the second cover portion 36 from the middle portion to the proximal portion.

The second cover portion 36 extends to connected parts of a boundary between the wiper arm 11 and the retainer 14, or to the end face 14c of the retainer 14, when the wiper blade 10 is attached to the wiper arm 11. A first end portion of the second cover portion 36 is continuously formed with the retainer 14, and the second cover portion 36 is continuous with the coupling portion 17.

The second cover portion 36 is formed such that the upper wall 36b and a wall portion of the retainer 14, or an upper wall 14b, are substantially flush with each other, and that side wall 36a and a wall portion of the retainer 14, or a side wall 14a, are substantially flush with each other. When the wiper arm 11 and the wiper blade 10 are assembled, that is, when the wiper arm 11 and the wiper blade 10 are substantially parallel to each other as viewed from a side, the side walls 36a of the second cover portion 36 are substantially flush with the side walls 17a of the coupling portion 17, and a second end portion of the second cover portion 36 lies along a side edge 17b of the coupling portion 17. The second end portion of the second cover portion 36 is formed slanted.

The coupling structure of the wiper arm 11 and the wiper blade 10 will now be described.

Figure 7A:
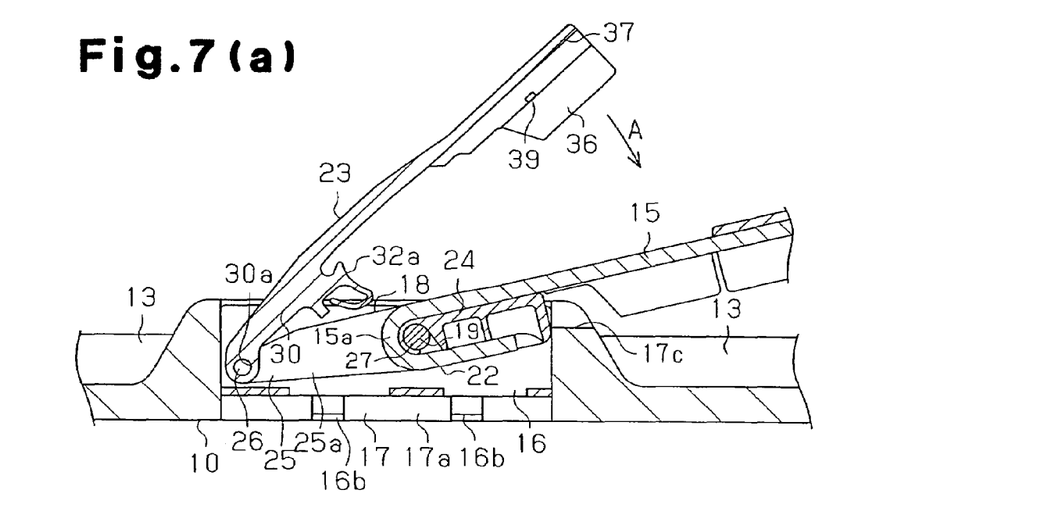
Figure 7B:
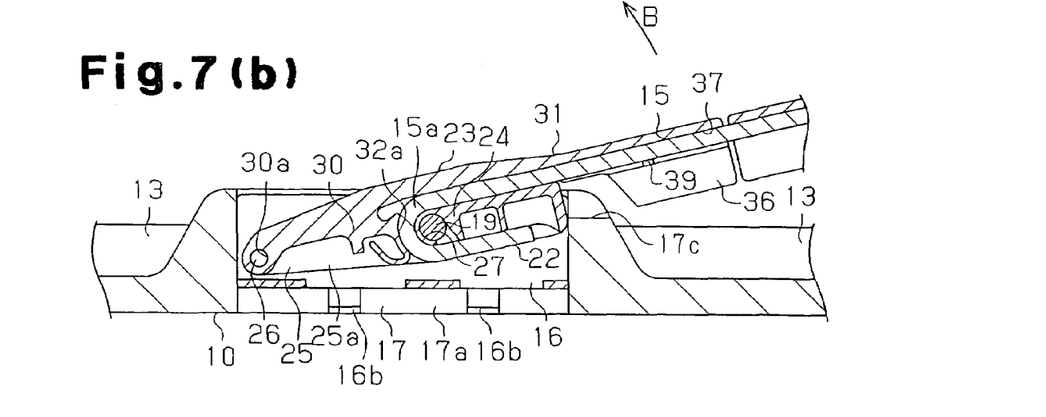
Figure 8:
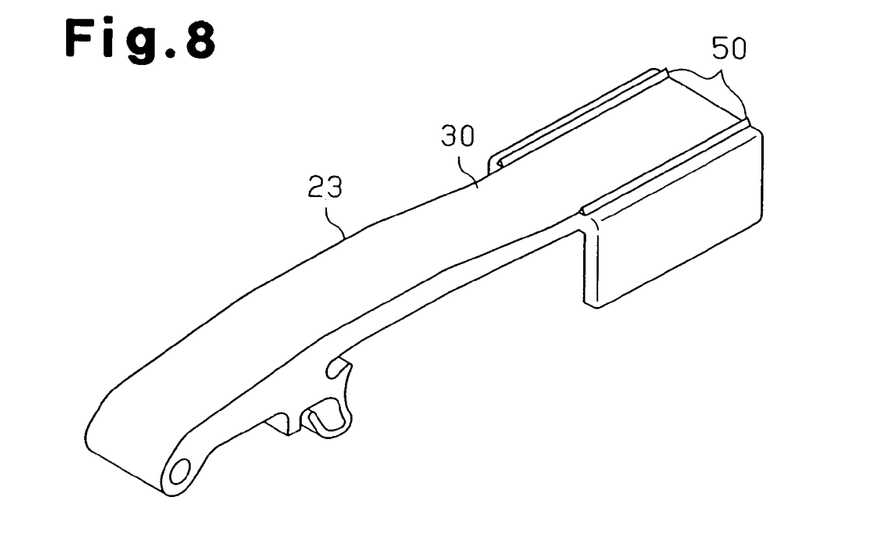
FIG. 8 is a perspective view illustrating a clip holder according to a modified embodiment.

As shown in FIGS. 7(a) and 7(b), the clip 22, which forms part of the coupling device 20, is pivotally supported by the coupling shaft 19 of the holder 16. The holder 16 has a plurality of holding portions 16b for holding the blade rubber (not shown) at the side of the wiper blade 10 facing the surface to be wiped. The clip 22 is held with the coupling shaft 19 inserted in the support hole 27. When the clip 22 is pivoted about the axis of the coupling shaft 19, the outer surfaces of the side walls 25a of the extended portion 25 slide on the inner surfaces of the holder 16.

The support pins 26 of the extended portion 25 are fitted in the support holes 30a of the clip holder 23. The clip holder 23 is attached to the clip 22 to be pivotable about the axis of the support pins 26. As shown in FIGS. 3(a), 3(b), 7(a), and 7(b), a cutaway portion 17c is formed in the coupling portion 17 of the wiper blade 10. The cutaway portion 17c prevents the wiper arm 11 from interfering with the proximal side walls of the coupling portion 17 and permits the wiper arm 11 to extend toward the proximal end.

Next, an operation of the coupling device 20 when the wiper blade 10 is attached to and detached from the wiper arm 11 will be described.

Attaching Wiper Arm 11 to Wiper Blade 10

As shown in FIG. 7(a), the distal portion of the wiper arm 11 is first inserted into the insertion opening 18 of the coupling portion 17 of the wiper blade 10, and the hook 15a of the arm piece 15 is engaged with the attaching portion 24 of the clip 22. Then, the clip holder 23 is pivoted clockwise about the support pins 26 of the clip 22 (in a direction of arrow A in FIG. 7(a)).

Consequently, as shown in FIG. 7(b), the cover 31 of the clip holder 23 covers the entire arm piece 15, and the engaging surface 32a of the locking portion 30 of the clip holder 23 contacts the curved surface of the hook 15a. Specifically, the clip holder 23 flexes the curved portion 32b of the engaging portion 32 along the curved surface of the hook 15a, and moves to an engage position shown in FIG. 7(b) relative to the clip 22. This causes the hook 15a to be engaged with the attaching portion 24 of the clip 22, and the hook 15a is prevented from coming off the attaching portion 24. In this manner, the clip holder 23 is located at the engage position, and the wiper blade 10 is firmly fixed to the distal portion of the wiper arm 11.

Detaching Wiper Blade 10 from Wiper Arm 11

The clip holder 23 is pivoted counterclockwise about the support pins 26 of the clip 22 from the engage position 5(in a direction of arrow B in FIG. 7(b)). Then, as shown in FIG. 7(a), the engaging surface 32a of the locking portion 30 separates from the curved surface of the hook 15a, and the proximal portion of the arm piece 15 is disengaged from the engaging projections 39. In other words, the clip holder 23 moves to a disengage position shown in FIG. 7(a) relative to the clip 22. Therefore, the hook 15a of the arm piece 15 is detached from the attaching portion 24 of the clip 22, which permits the wiper blade 10 to be removed from the distal portion of the wiper arm 11.

This embodiment provides the following advantages.

(1) By placing the clip holder 23 at the engage position with respect to the clip 22 as shown in FIG. 3(b), the distal portion 11a of the wiper arm 11 is engaged with the locking portion 30 of the clip holder 23, and the engaged parts are covered with the cover 31 of the clip holder 23. That is, an additional cover member is not needed, and the engagement of the locking portion 30 of the clip holder 23 with the distal portion 11a of the wiper arm 11 permits the cover 31 of the clip holder 23 to be attached to the distal portion 11a of the wiper arm 11. Further, the cover 31 covers the engaged parts. Therefore, the boundary between the distal portion 11a of the wiper arm 11 and the locking portion 30 of the clip holder 23 is not visible from the outside. Accordingly, the entire wiper blade assembly has an integrated appearance, and the appearance is improved.

(2) When the clip holder 23 is at the engage position shown in FIG. 7(b), the second cover portion 36 extends to the connected parts of the boundary between the fixed portions of the retainer 14 and the arm piece 15, or to the end face 14c of the retainer 14 (see FIG. 3(b)), which makes steps at the fixed portions inconspicuous. Also, as shown in FIGS. 3(a) and 3(b), the ends of the second cover portion 36 are arranged to be continuous with the retainer 14 of the wiper arm 11 and the coupling portion 17 of the wiper blade 10. Thus, clearances and steps between the retainer 14 and the coupling device 20 are reduced. Accordingly, the entire wiper blade assembly has an integrated appearance, and the appearance of the wiper blade 10 is further improved.

(3) As shown in FIGS. 5(a) and 6, the width a of the first cover portion 35 of the cover 31 is substantially the same as the width b of the insertion opening 18 formed in the coupling portion 17. The engaged parts of the locking portion 30 of the clip holder 23 and the distal portion 11a of the wiper arm 11 are therefore reliably covered with the cover 31. This prevents in cold climates snow from collecting on the engaging portions of the engaging surface 32a of the locking portion 30 and the hook 15a . Also, the configuration prevents water droplets from entering the engaged parts and being frozen in the wiper blade 10 to hinder the operation of the wiper blade 10.

(4) As shown in FIG. 4(a), the pair of the support pins 26 are formed at the end portion of the clip 22, and the clip holder 23 is pivotally supported by the support pins 26. This structure permits the clip 22 and the clip holder 23 to be handled as a single member, which facilitates the assembly of the wiper blade 10. Also, the locking portion 30 is moved between a position to be engaged with the hook 15a and the disengage position to be separated from the hook 15a simply by pivoting the clip holder 23 about the axis of the support pins 26. This facilitates assembly and disassembly of the wiper blade 10.

(5) By flexing the curved portion 32b of the engaging portion 32, the engaging portion 32 is elastically engaged with the hook 15a. Therefore, when the clip holder 23 is located at the engage position shown in FIG. 7(b), elastic force of the curved portion 32b of the engaging portion 32 urges the engaging surface 32a toward the curved surface of the hook 15a. Therefore, even if an undue external force is applied to the wiper blade 10, the engagement between the locking portion 30 and hook 15a is reliably maintained. Thus, the wiper blade 10 hardly comes off the distal portion of the wiper arm 11.

(6) The pair of the engaging projections 39 are formed in the second cover portion 36 of the cover 31, and the engaging projections 39 face each other. When the clip holder 23 is at the engage position shown in FIG. 7(b), not only the engaging surface 32a of the locking portion 30 is engaged with the curved surface of the hook 15a, but also the proximal portion of the arm piece 15 is engaged with the engaging projections 39. Therefore, even if an undue external force is applied to the wiper blade 10, the engagement between the locking portion 30 and hook 15a is further reliably maintained. Therefore, the wiper blade 10 hardly comes off the distal portion of the wiper arm 11.

(7) The outer surfaces of the side walls 22a of the clip 22 contact the inner surfaces of the holder 16. By permitting the outer surfaces of the side walls 22a of the clip 22 to slide on the inner surfaces of the holder 16, the wiper blade 10 is prevented from rattling with respect to the wiper arm 11. That is, the wiper blade 10 attached to the wiper arm 11 is prevented from rattling in a direction perpendicular to the surface to be wiped.

(8) Since the cover 31 extends along the longitudinal direction of the wiper arm 11, a user can easily hold the cover 31. Also, since the cover 31 extends away from the support hole 30a, which functions as a fulcrum when the clip holder 23 pivots, the clip holder 23 is easily pivoted away from the engage position shown in FIG. 7(b). Therefore, the clip holder 23 is easily pivoted relative to the clip 22 away from the engage position without using any tools, which further facilitates assembly and disassembly of the wiper blade 10.

It should be apparent to those skilled in the art that the present invention may be embodied in many other specific forms without departing from the spirit or scope of the invention. Particularly, it should be understood that the invention may be embodied in the following forms.

Figure 9:
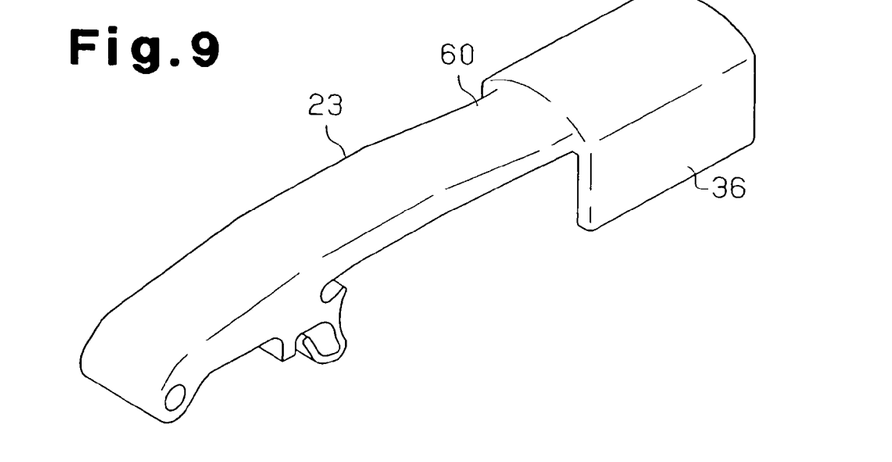
FIG. 9 is a perspective view illustrating a clip holder according to another modified embodiment.

In the embodiment of FIGS. 1 to 7(b), the clip holder 23 is formed by molding a resin material. Particularly, being formed relatively thin, the second cover portion 36 tends to have less mechanical strength than the first cover portion 35. Therefore, to reinforce the strength of the cover 31, the second cover portion 36 may be provided with a plurality of projections 50 that extends along the cover 31 of the clip holder 23, more specifically, along the longitudinal direction of the clip holder 23. Alternatively, as shown in FIG. 9, the entire second cover portion 36 may be formed round and thick. Since these modifications are applicable simply by changing the shape of the clip holder 23 and require no additional parts, the manufacturing costs are not increased.

The locking portion 30 may be replaced by a clip holder 60 that is formed round as a whole as shown in FIG. 9. When the clip holder 60 is applied to a wiper arm 11 having a circular cross-section, the entire wiper blade assembly has an integrated appearance. The shape of the cover 31 of the clip holder 60 may be changed according to the cross-sectional shape of the wiper arm 11.

The shape of the end portion of the second cover portion 36, which is continuous with the coupling portion 17, may be changed according to the shape of the coupling portion 17 of the wiper blade 10.

The hook 15a does not need to have the U-shaped cross-sectional shape, but may have a V-shaped cross-sectional shape. In this case, the attaching portion 24, to which the hook 15a is attached, is preferably formed to conform to the substantially V-shaped inner surfaces of the hook 15a.

The engaging portion 32 may be made of an elastic material such as rubber and an elastomer.

More than one pair of the engaging projections 39 may be formed in the second cover portion 36. If two or more pairs of the engaging projections 39 are provided, the wiper blade 10 and the wiper arm 11 is prevented from being accidentally disengaged by an unintended application of external force.

Therefore, the present examples and embodiments are to be considered as illustrative and not restrictive and the invention is not to be limited to the details given herein, but may be modified within the scope and equivalence of the appended claims.

The invention claimed is:

1. A wiper blade assembly pivotally attached to a distal portion of a wiper arm, the assembly comprising:
a wiper blade having a coupling portion, wherein the coupling portion has a coupling shaft and an insertion opening to which the distal portion of the wiper arm is inserted; and
a coupling device pivotally supported by the coupling shaft, wherein the coupling device includes:
a base member to which the distal portion of the wiper arm is attached; and
a locking member having a locking portion and a cover, wherein the locking member is movable relative to the base member between an engage position and a disengage position, wherein, when the locking member is located at the engage position, the locking portion is engaged with the distal portion of the wiper arm, and the engaged parts of the distal portion of the wiper arm and the locking portion are covered with the cover,
wherein the wiper arm includes a retainer extending along a longitudinal direction of the wiper arm and an arm piece extending from a distal end of the retainer, wherein the cover extends from the locking portion to the boundary between the retainer and the arm piece.

2. The wiper blade assembly according to claim 1, wherein the base portion is pivotally supported by the coupling shaft.

3. The wiper blade assembly according to claim 1, wherein the cover extends from the locking portion along the longitudinal direction of the wiper arm.

4. The wiper blade assembly according to claim 1, wherein the arm piece is detachably attached to the base member.

5. The wiper blade assembly according to claim 1, wherein, when the locking member is located at the engage position, the cover substantially covers the entire arm piece.

6. The wiper blade assembly according to claim 1, wherein the cover has a pair of side walls that are substantially flush with side walls of the retainer when the locking member is located at the engage position.

7. The wiper blade assembly according to claim 6, wherein the arm piece has a width narrower than the width of the retainer, and wherein, when the locking member is located at the engage position, the side walls of the cover support the arm piece.

8. The wiper blade assembly according to claim 6, wherein the cover has an engaging portion that is engaged with the arm piece.

9. The wiper blade assembly according to claim 1, wherein part of the cover that corresponds to the insertion opening has a width that is substantially the same as the width of the insertion opening.

10. The wiper blade assembly according to claim 1, wherein the base member has an attaching portion and an extended portion, the distal portion of the wiper arm being attached to the attaching portion, the extended portion extending from the attaching portion toward a distal end of the wiper blade along the longitudinal direction, wherein the locking member is pivotally coupled to the extended portion.

11. A wiper of a vehicle for wiping a surface to be wiped of the vehicle, the wiper comprising:
a wiper arm having a distal portion and a proximal portion, wherein the proximal portion is fixed to a pivot that is pivotally supported by a vehicle body, wherein the wiper arm is urged to the surface to be wiped;
a wiper blade having a coupling portion, wherein the coupling portion has a coupling shaft and an insertion opening to which the distal portion of the wiper arm is inserted; and
a coupling device pivotally supported by the coupling shaft, wherein the coupling device includes:

a base member to which the distal portion of the wiper arm is attached; and a locking member having a locking portion and a cover, wherein the locking member is movable relative to the base member between an engage position and a disengage position, wherein, when the locking member is located at the engage position, the locking portion is engaged with the distal portion of the wiper arm, and the engaged parts of the distal portion of the wiper arm and the locking portion are covered with the covers, wherein the wiper arm includes a retainer extending along a longitudinal direction of the wiper arm and an arm piece extending from a distal end of the retainer, wherein the cover extends from the locking portion to the boundary between the retainer and the arm piece.

12. The wiper according to claim 11, wherein the cover extends from the locking portion along the longitudinal direction of the wiper arm.

13. The wiper according to claim 11, wherein the wiper arm further includes:

an arm head having a proximal portion and a distal portion, the proximal portion being fixed to the pivot, wherein the retainer has a proximal portion that is pivotally coupled to the distal portion of the arm head such that the retainer is capable of contacting and separating from the surface to be wiped, wherein the retainer has a channel-like cross-section and opens to the surface to be wiped, and wherein the arm piece has a hook that is attached to the base member.

14. The wiper according to claim 13, wherein part of the cover that corresponds to the insertion opening has a width that is substantially the same as the width of the insertion opening.

15. The wiper according to claim 13, wherein the base member has an attaching portion and an extended portion, the hook being attached to the attaching portion, the extended portion extending from the attaching portion toward a distal end of the wiper blade along the longitudinal direction, wherein the locking member is pivotally coupled to the extended portion.

16. The wiper according to claim 11, wherein the cover has a pair of side walls that are substantially flush with side walls of the retainer when the locking member is located at the engage position.

17. The wiper according to claim 16, wherein the cover has an engaging portion that is engaged with the arm piece.

* * * * *